April 20, 1937.  M. JELALIAN  2,077,798
RECIPROCATING WINGED DEVICE FOR AIRPLANES
Filed Aug. 27, 1936  5 Sheets-Sheet 5

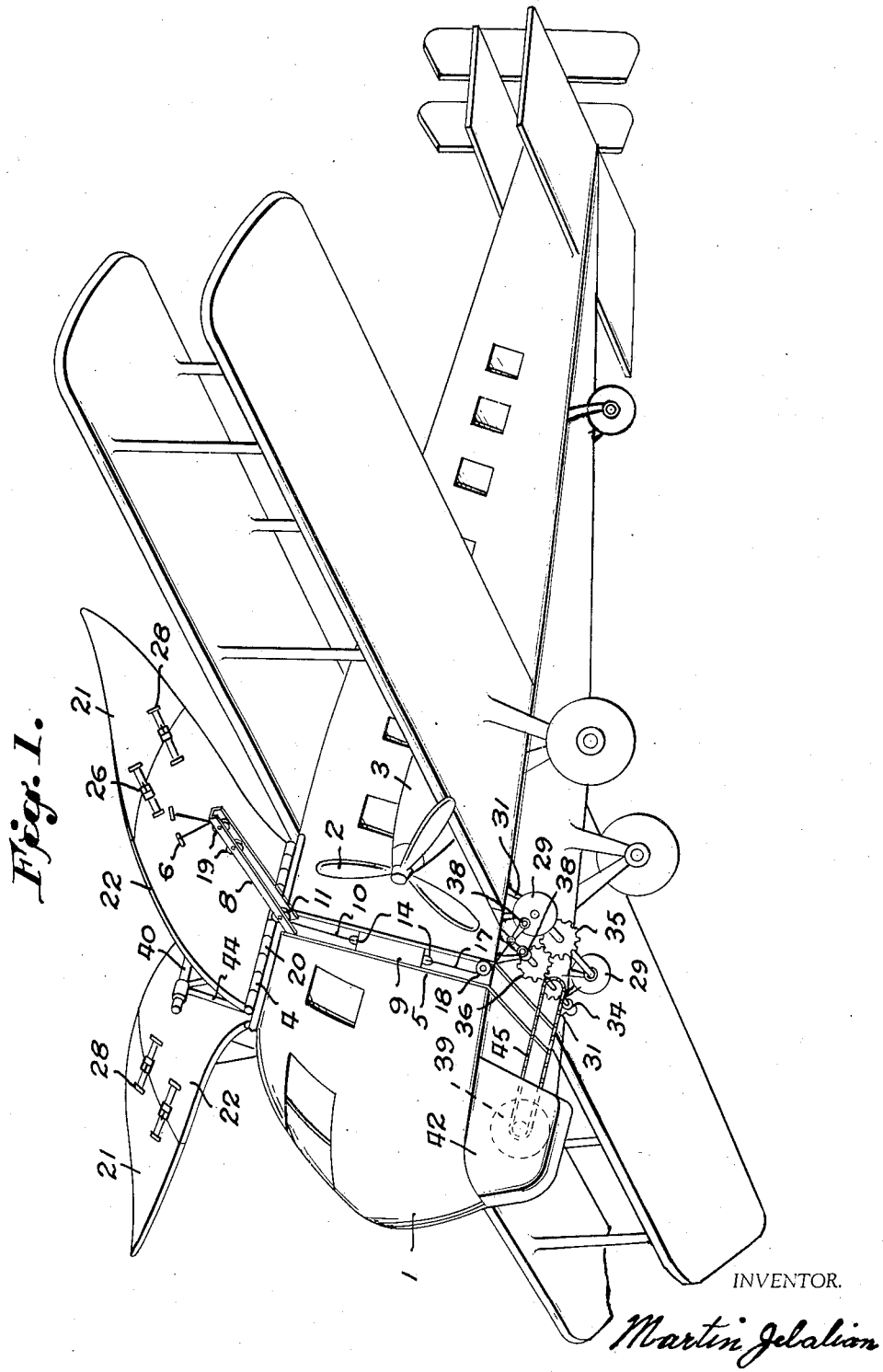

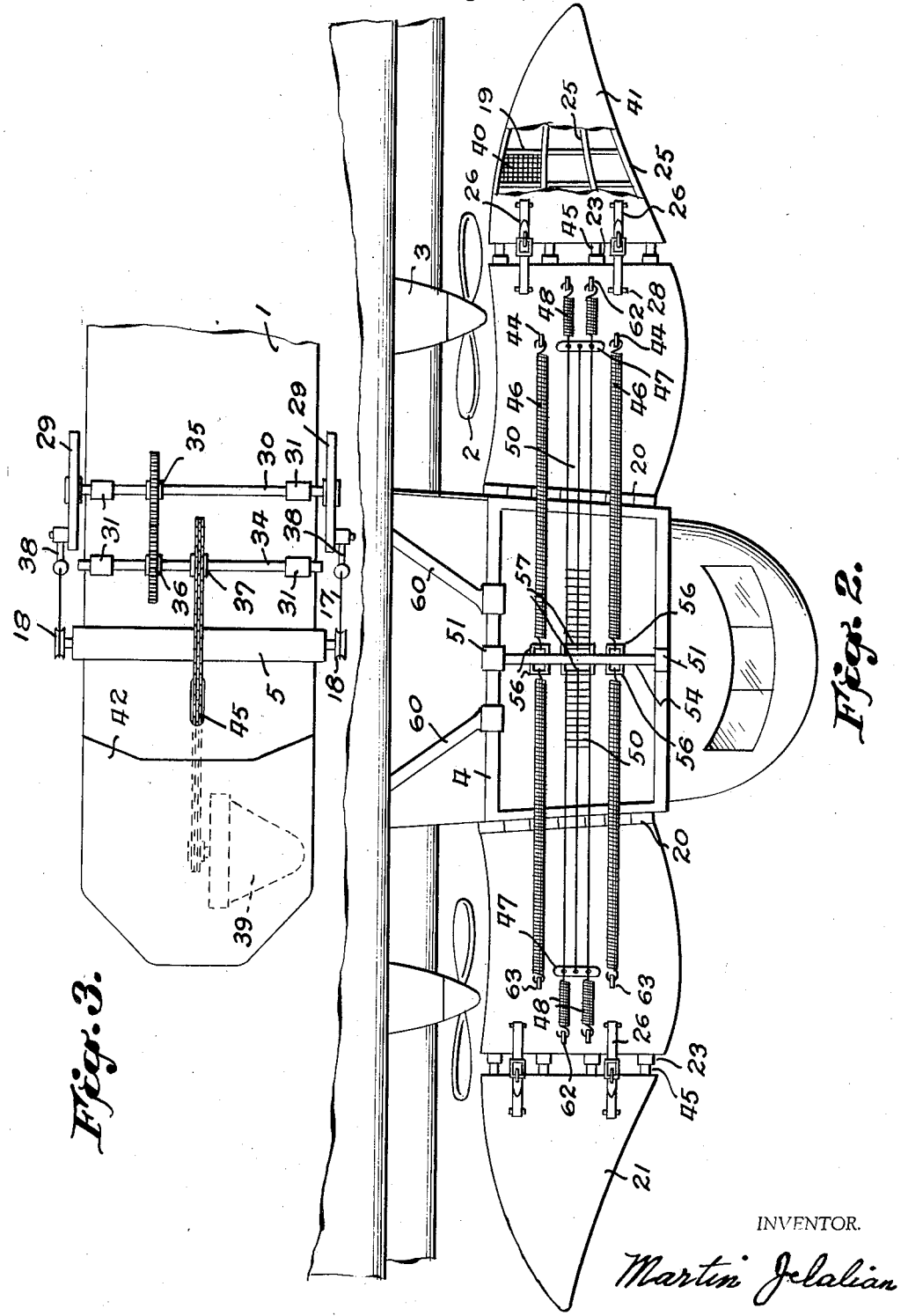

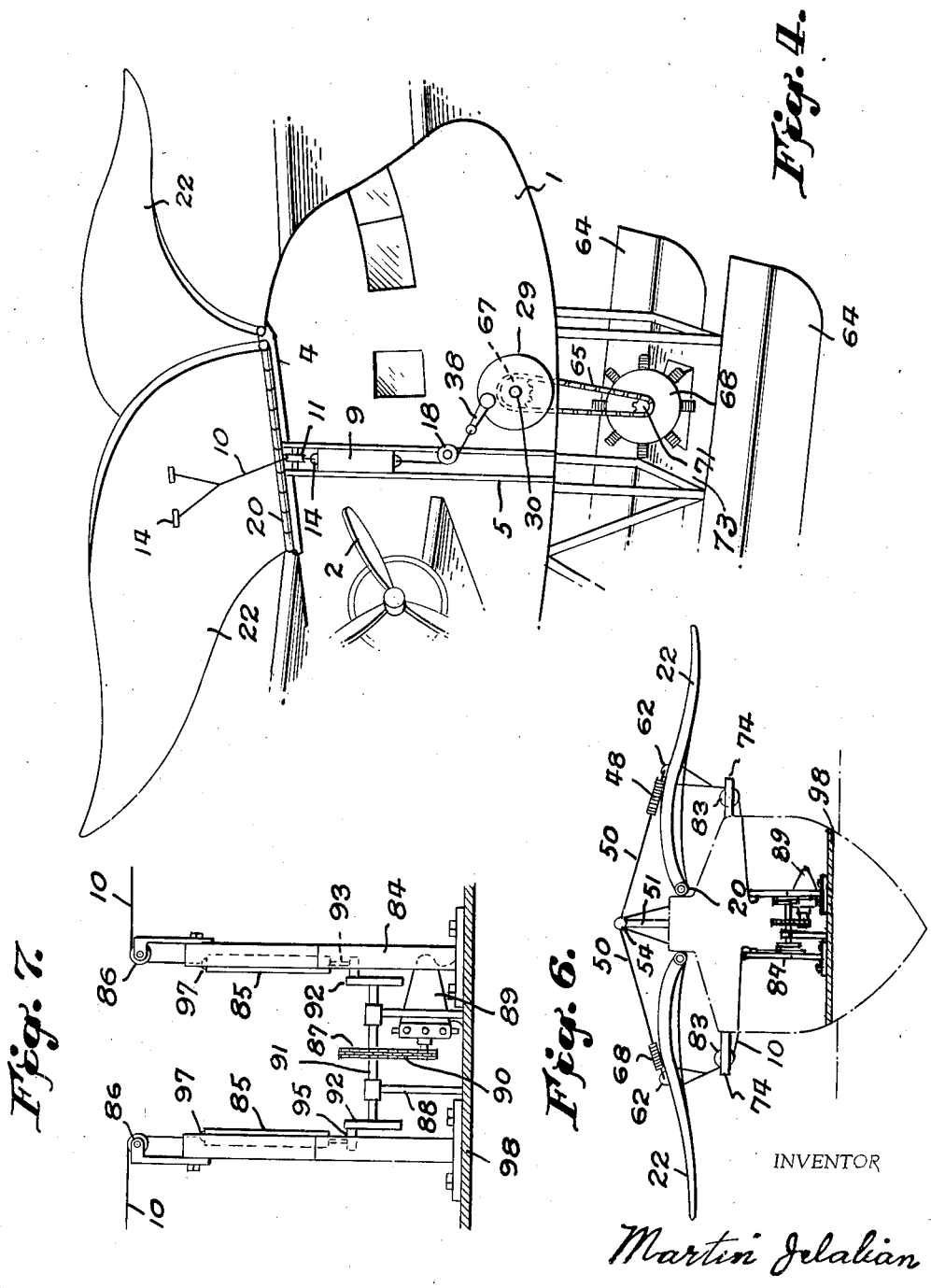

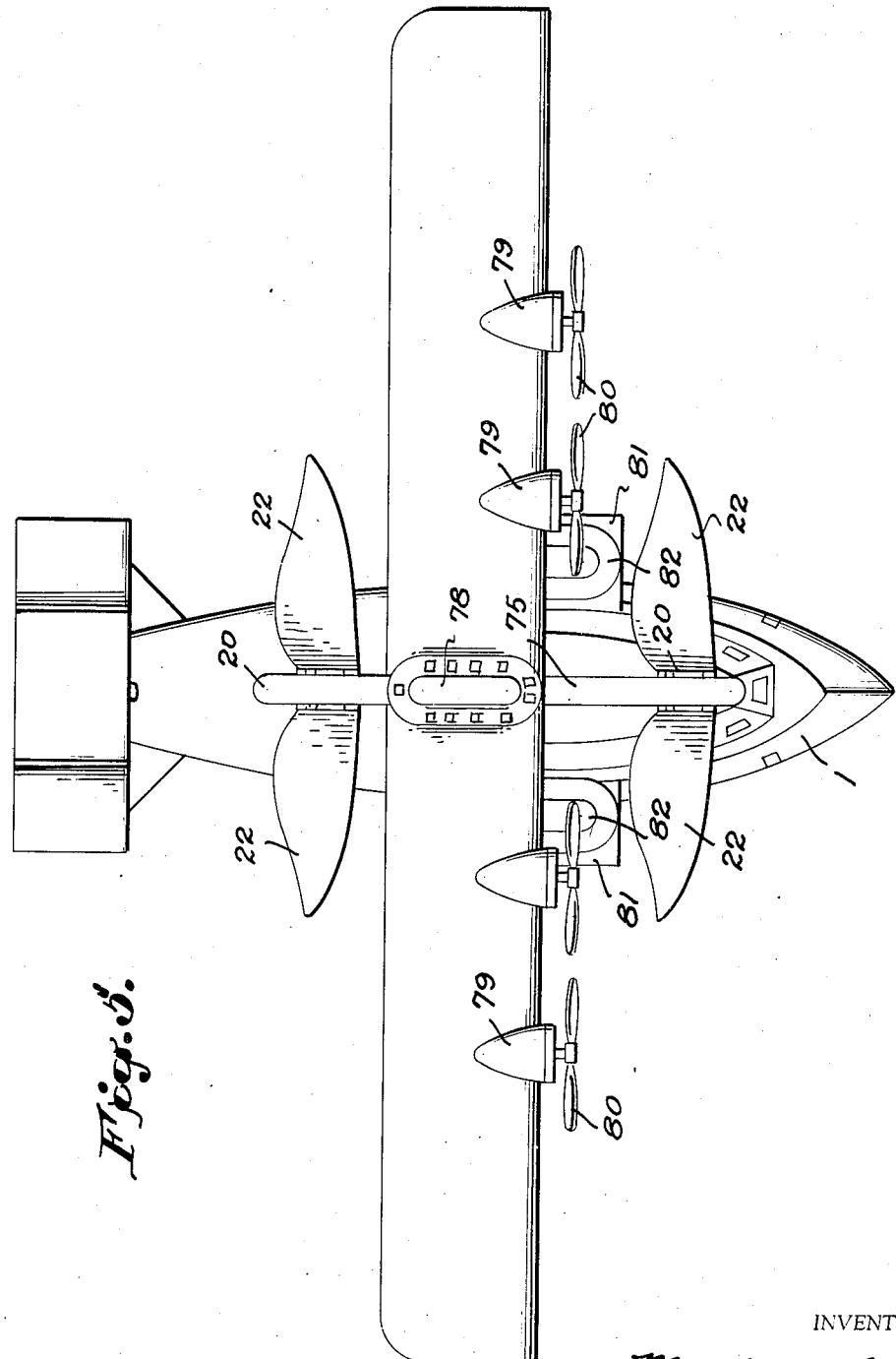

INVENTOR.
Martin Jelalian

Patented Apr. 20, 1937

2,077,798

UNITED STATES PATENT OFFICE 2,077,798

RECIPROCATING WINGED DEVICE FOR AIRPLANES

Martin Jelalian, New York, N. Y.

Application August 27, 1936, Serial No. 98,182

1 Claim. (Cl. 244—11)

The object of this invention is to provide a vertically reciprocating winged device for airplanes that are capable of travelling on land or water.

The said winged device which imparts additional beauty to the said airplanes is arranged forwardly to the cabins of the same and comprises a U-shaped slide support member provided with an integral rectangular top frame member having reciprocating wings hingedly connected to and projecting outwardly therefrom as to assist the revolving propellers of the said airplanes in lifting operations.

The further disclosure of the invention is described in the accompanying five sheets of drawings forming a part of this specification and in which:

Fig. 1 is a side perspective elevation of the winged device as secured forwardly to a large airplane cabin capable of travelling specially on land.

Fig. 2 is a top detail plan view of the winged device illustrating the coil spring and also yieldable wire strip connections in detail as arranged above the said winged device forwardly to the said airplane cabin.

Fig. 3 is a bottom plan view of the winged device showing wing-shafts and gear connections and also chain connections with a motor that is secured within a housing and located at the forward end upon the bottom of the said airplane cabin.

Fig. 4 is a side perspective elevation of the device as adapted to a type of airplane specially designed to travel on water, provided with a pair of floating structures beneath the same and the motor as being mounted upon a fixed platform located between said floating structures.

Fig. 5 is a top perspective view of an extra large hydro-airplane as provided with the winged device in a modified form.

Fig. 6 is a transverse sectional view of the said hydro-airplane cabin showing wing-rope connections with a pair of oppositively arranged forked shaped slidable members as secured upon a fixed platform located within said hydro-airplane cabin and provided with inner slidable members having connections with a wing shaft that is driven by a motor located upon the said platform.

Fig. 7 is an enlarged detail view of the pair of oppositively arranged forked-shaped slidable support members provided with the inner slidable guard members as relative with a wing operating shaft located between the latter.

Figure 8:
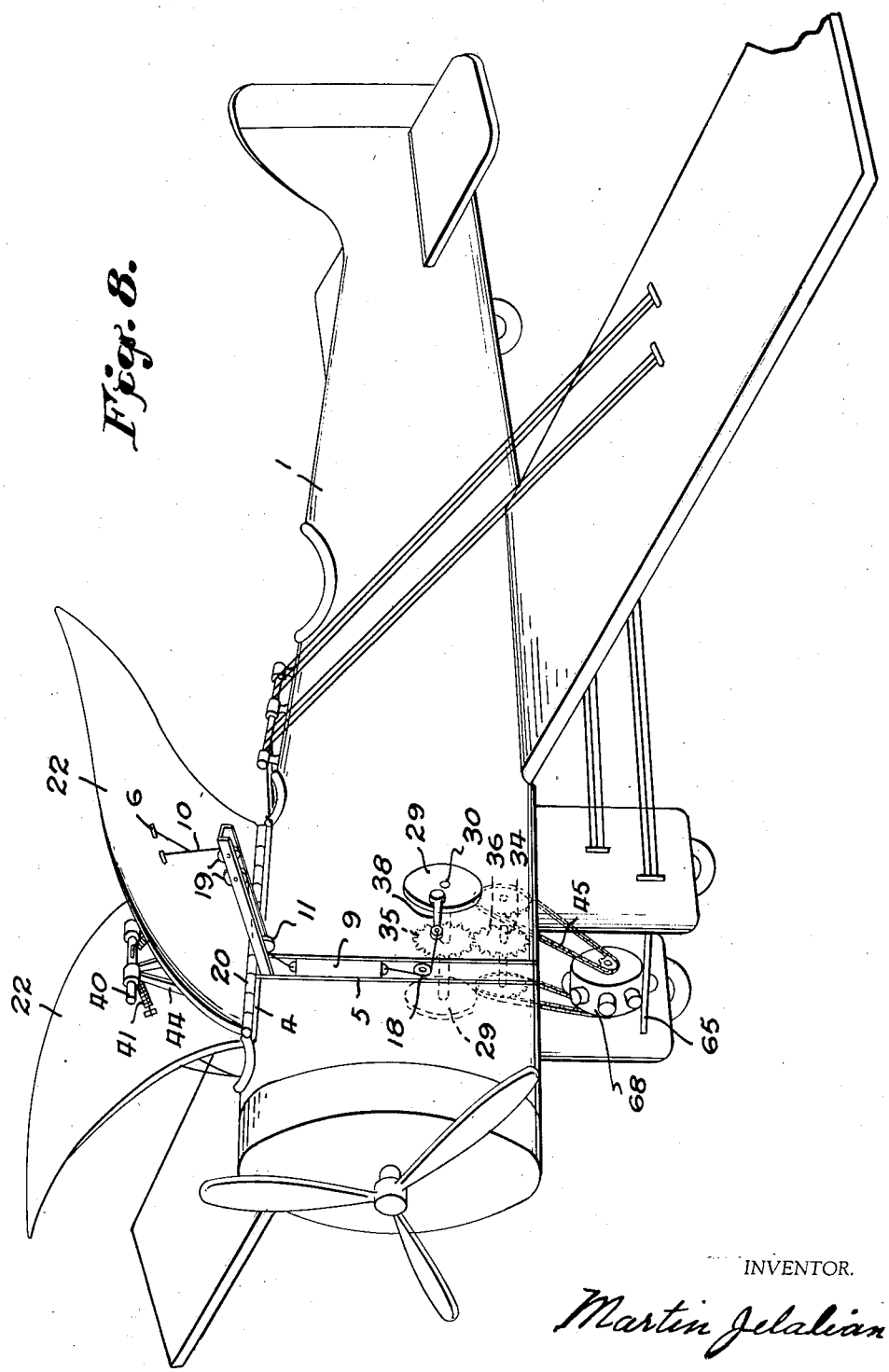
Fig. 8 showing a side perspective elevation of a modified type of airplane as adapted specially for travelling on land and as provided with the winged device.

Referring to the drawings, numeral 1 designates an airplane cabin which is provided with a revolving propeller 3 on each side thereof.

Secured to the forward portion of the said airplane cabin 1 is a U-shaped slidable support member 5 which is provided with integral outwardly extending pulley-supporting arms 8, 8 projecting outwardly from said U-shaped member at a position centrally beneath said wings and supporting pulleys 11, 19 and 19.

The said U-shaped slidable guard support member 5 is provided with inner slidable members 9, 9 and also having an integral rectangular top frame member 4.

Hingedly connected to the said integral top frame member 4 of the said U-shaped support member 5 as shown at 20, 20 and extending outwardly therefrom are vertically reciprocating wings 22, 22 which are provided with detachable outer end portions 21, 21.

A pull rope 10 has one of its ends connected to the integral hooks 6, 6 that are provided upon the bottom of the said vertically reciprocating wings 22, 22 and extends over pulleys 19, 19 and also passes over pulley 11 and its opposite end is connected to an integral hook 14 located at the upper end of the said inner slidable member 9.

A pulley 18 is arranged at the lower end of the said U-shaped guard slidable member 5 in order to receive rope 17 said rope has one of its ends attached to the integral hook 14 that is provided at the lower end of the said inner slidable member 9 and the opposite end secured to the end portion of an eyelet 38 which is loosely mounted upon the outwardly projecting integral shaft of an integral wheel 29 that is secured upon the end portion of a wing shaft 30 which extends transversely beneath the said airplane cabin 1 and is supported by shaft support members 31, 31.

A gear shaft 34 is also arranged forwardly to the said wing-shaft 30 which is also supported by shaft support members 31, 31 and provided with an integral gear 36 which meshes with gear 35 that is mounted upon wing shaft 30.

Secured to and projecting from the bottom from the forward end of the said airplane car 1 is a motor cable 42 which supports motor 39 having chain connection 45 with an integral gear 37 mounted upon shaft 34.

In order to permit yieldable movements to said wings 22, 22 and support the same coil pull springs 46, 46 and also yieldable wire strips 50, 50 are arranged above the same as shown in detail in Fig. 2.

Yieldable wire strips 50, 50 have one of their ends attached to the integral hooks 57, 57 and the opposite ends provided with coil pull-spring holder members 47, 47 and have coil pull-spring connections 48, 48 with integral hooks 62, 62 that are located upon the top of the said vertically reciprocating wings 22, 22.

Coil pull springs 46, 46 are also arranged one on each side of the said wire strips 50, 50 and have one of their ends secured to the integral hooks 56, 56 of the longitudinally extending hook support member 54 and the opposite ends connected to the integral hooks 44, 44.

Coil-spring hook support member 54 which extends longitudinally above the said airplane cabin 1 and is supported by vertically extending supports 51 and 55 which are integral with the rectangular top support member 4 of the U-shaped guard slidable support member 5.

The outer ends 21, 21 of the said vertically reciprocating wings 22, 22 are detachable and provided with strap connections 26, 26 for detachably connecting to one another.

Each outer end portion 21, 21 of the said wings 22, 22 is provided with a series of longitudinally extending wing support members 25, 25 having flat sided slidable end portions 45, 45 adapted to slidably enter within the end portions of the longitudinally extending wing support members 23, 23 of each of the sections of the said wings 22, 22.

The wings 22, 22 are also provided with coil pull spring connections 33, 33 within the inner ends thereof, which are located between the pivotal connections of the same.

A series of transversely extending connecting wing supports 19, 19 are arranged for the outer end portions 21, 21 of the said wings 22, 22 which are connected to the slidable supports 25, 25; a wire netting 40 is secured to the said supports and a layer of fine tin applied to the netting.

Each of the sectional wings 22, 22, comprises a series of longitudinally extending wing support members 23, 23 and is also provided with transversely arranged connecting wing supports 19, 19, a fine wire netting and a layer of tin in the same manner as the said outer end portions 21, 21 of the said wings 22, 22.

In Fig. 4 is shown the winged device as applied to an hydro-airplane provided with a pair of floating structures 64, 64. In this equipment the device comprises the same arrangement as shown and descibed in Fig. 1, with the exception that the outwardly projecting arm 8 of the U-shaped slidable support member 9 is omitted and the motor 68 is mounted upon a fixed platform 73 instead of within a housing 42 that projects from the bottom of the plane 1 and has chain connections directly with gear 67 mounted upon wing-shaft 30 instead of gear 37 that is mounted upon shaft 34 which projects transversely through the lower portion of the hydro-airplane cabin 1 as shown in Fig. 4.

In Fig. 5 the device is shown as equipped for a large hydro-monoplane 1 which is provided with a cabin 78 and also cabins 82, 82 upon each side thereof, which are mounted upon side projections 81, 81 and the said plane 1 is arranged with propellers 80, 80 driven by motors 79, 79.

In this modified form the wings 22, 22 are arranged in two pairs located forwardly and rearwardly of the plane and hingedly connected to the longitudinally extending plane supporting cabins 75 of the said monoplane car 1 and extend outwardly from each side thereof and support yieldable wire strips 50, 50 and also coil pull-spring connections 46, 46 in the same manner as described in Fig. 2.

In this modified form Fig. 5, pulley support members 74, 74 are arranged which are connected upon each side of the ship 1 and project outwardly therefrom and support pulleys 83, 83 to receive wing-rope connections 10, 10 that are attached to the integral hooks 97, 97 of the inner slidable members 85, 85.

In this arrangement, Fig. 5, a pair of vertically arranged oppositely located slidable guard support members 84, 84 are arranged which are mounted upon platform 98 and have a wing operating shaft 91 therebetween supported by a pair of vertical supports 88, 88 and provided with an integral gear 87 having chain connections 90 with a motor 89 which is mounted upon the said platform 98.

The lower portions of the said oppositively arranged slidable guard support members 84, 84 are fork-shaped in order to permit the yieldable movements of the arm connections 93, 93 which have one of their ends pivotally connected to the lower end portions of the said inner slidable members 85, 85 and the opposite ends provided with eyelets and loosely mounted upon the outwardly projecting integral shafts 95, 95 of the integral wheels 92, 92 which are provided at the end portions of the said wing-shaft 91 as shown in detail in Fig. 7.

Thus it will be obvious that when shaft 91 is operated by motor 89 through chain connections 90 the wings 22, 22 will receive up and down vertically reciprocating movements in the manner of the wings of a bird.

In Fig. 8 is shown the device as equipped for another type of airplane adapted specially for travelling on land; in this arrangement the winged device is arranged in the same manner as shown and described in Fig. 1, with the exception that the shafts 30 and 34 are arranged within the car and project transversely through the lower portion of the same instead of being located beneath the latter and supported by shaft-support members 31, 31 as shown in Fig. 1, and has chain connections 45 with motor 68 which is mounted upon a fixed platform 65.

In Figures 4, 5 and 8 the outer ends of the vertically reciprocating wings 22, 22 are not detachable, being in one section.

Thus having fully described my invention what I claim as new and desire to secure by Letters Patent is:

In an airplane, a cabin, a U-shaped slide support member surrounding and secured to the forward portion of the said cabin, a rectangular top frame member integrally connected to said U-shaped member, reciprocating wings hingedly connected to said rectangular frame member and extending outwardly laterally therefrom, pulley supporting arms integrally connected to and projecting outwardly from said U-shaped member at a position centrally beneath said wings, slide members on said U-shaped slide support member, pulleys supported in said arms, means extending transversely beneath said cabin, cables connected to said shaft means, slides, pulleys and wings for reciprocating the wings, a motor enclosing housing at the forward end and beneath said cabin, a motor geared to said shaft means supported centrally in said housing whereby the shaft means may be rotated and the wings reciprocated.

MARTIN JELALIAN.